(12) United States Patent
Walsh

(10) Patent No.: US 6,332,488 B1
(45) Date of Patent: Dec. 25, 2001

(54) APPARATUS FOR USE IN FORMING CARTON BLANKS

(75) Inventor: Joseph C. Walsh, Boulder, CO (US)

(73) Assignee: Graphic Packaging Corporation, Golden, CO (US)

( * ) Notice: Subject to any disclaimer, the term of this patent is extended or adjusted under 35 U.S.C. 154(b) by 0 days.

(21) Appl. No.: 09/165,654

(22) Filed: Oct. 3, 1998

Related U.S. Application Data

(63) Continuation-in-part of application No. 08/548,191, filed on Oct. 25, 1995, now abandoned.

(51) Int. Cl.[7] .............................. B32B 31/00; E04D 1/12
(52) U.S. Cl. .................... 156/516; 156/549; 156/555; 156/257; 156/268; 156/252; 156/270; 229/185.1; 229/800; 493/60; 493/64; 493/132; 493/160
(58) Field of Search ...................... 156/516, 555, 156/547, 257, 268, 549, 252, 270; 229/185.1, 800; 493/60, 64, 132, 160

(56) References Cited

U.S. PATENT DOCUMENTS

| | | | |
|---|---|---|---|
| 3,942,708 | 3/1976 | Christensson | 229/582 |
| 4,594,125 * | 6/1986 | Watson | 156/516 |
| 5,709,766 * | 1/1998 | Press et al. | 156/307.3 |
| 5,746,871 * | 5/1998 | Walsh | 156/268 |
| 5,783,030 * | 7/1998 | Walsh | 156/549 |

* cited by examiner

Primary Examiner—Linda Gray
(74) Attorney, Agent, or Firm—Klaas, Law, O'Meara & Malkin, P.C.; William P. O'Meara, Esq.; Joseph J. Kelly, Esq.

(57) ABSTRACT

Apparatus having laminating rolls for laminating continuous strips of different kinds of material together wherein all of the continuous strips enter the nip between the laminating rolls from one side of a plane tangent to each of the laminating rolls at the nip. Also, apparatus having rotary cutting and creasing rolls located before the laminating rolls form most of the cut lines for the carton blank without changing the continuity of a continuous strip of a relatively rigid material so that it can be pulled through the laminating rolls. In those instances wherein two carton blanks are formed at the same time, scrap removal apparatus is provided for removing scrap located between the two carton blanks.

16 Claims, 4 Drawing Sheets

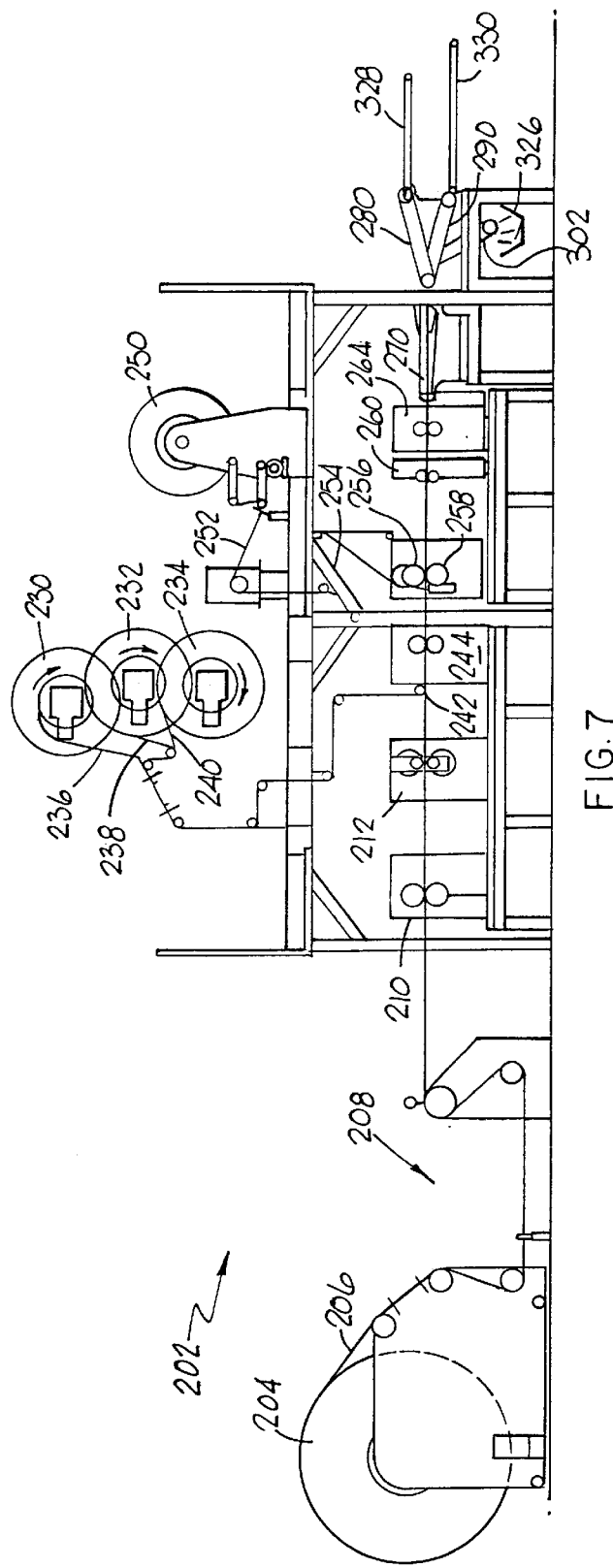
FIG. 7
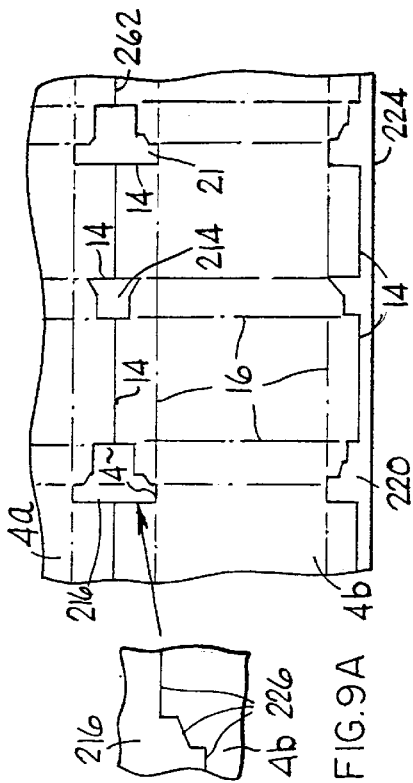
FIG. 9
FIG. 9A
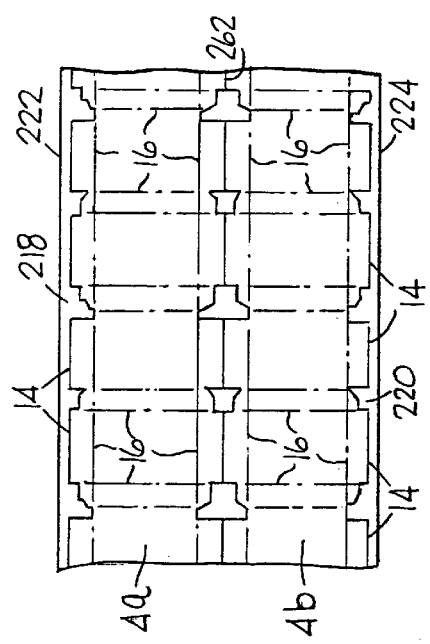
FIG. 8

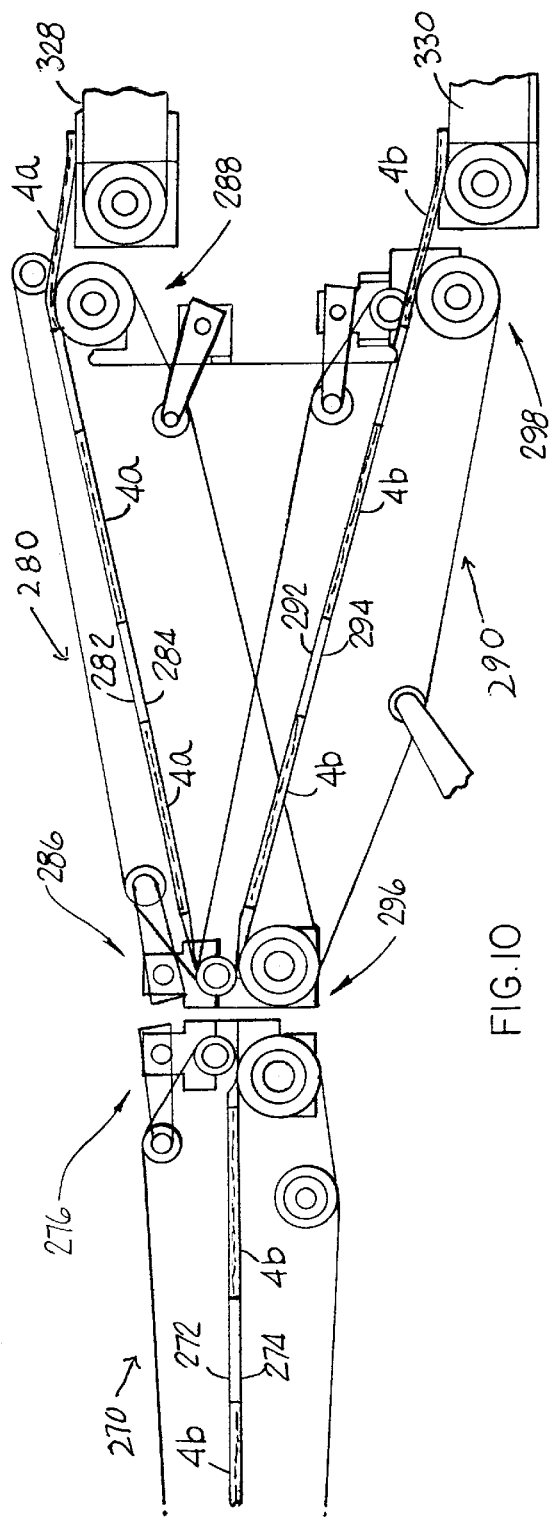
FIG.10
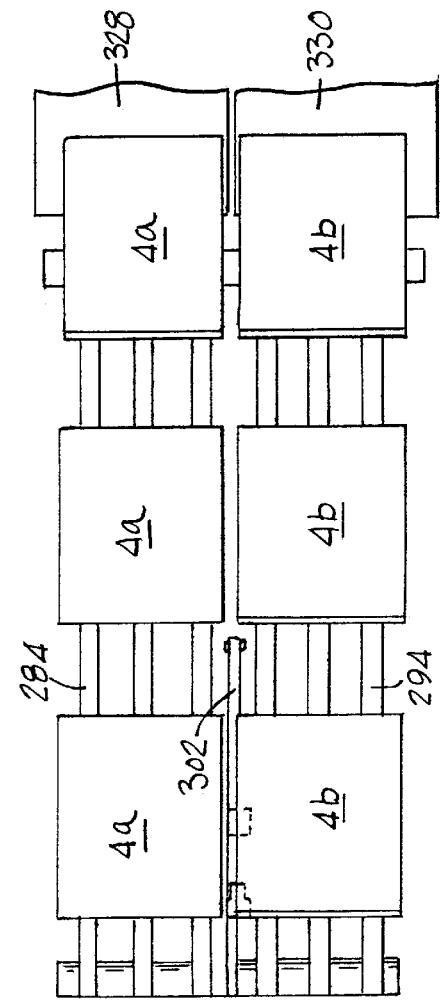
FIG.11
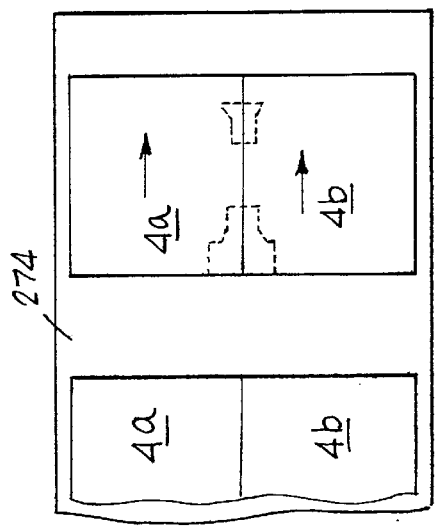

APPARATUS FOR USE IN FORMING CARTON BLANKS

FIELD OF THE INVENTION

This application is a Continuation-In-Part application of U.S. patent application Ser. No. 08/548,191 filed Oct. 25, 1995, now abandoned.

BACKGROUND OF THE INVENTION

In some processes for forming carton blanks, apparatus is used to laminate together a continuous strip of a relatively rigid material and a continuous strip of a relatively flexible material. Under some operating conditions, there is a tendency for the laminated materials to curl. The operating conditions relate to the type of adhesive being used and the manner in which the continuous strip of a relatively rigid material and the continuous strip of a relatively flexible material are fed into the nip between the laminating rolls. In the curled product, an arcuate shape extending in the machine direction is formed between the ends of the carton blank wherein the inner surface of the arcuate shape comprises the relatively flexible material. Under these conditions, the adhesive being used is a liquid adhesive that is tacky at room temperatures which under desirable operating conditions is between 60° F. and 80° F. but could be as high as 110° F. However, as the temperature approaches 110° F., the liquid adhesive does not perform as well. Also, under these conditions, the continuous strip of a relatively rigid material and the continuous strip of a relatively flexible material are fed from opposite sides of a plane tangent to the laminating rolls at the nip therebetween or at least one of the continuous strips is in the plane tangent to the laminating rolls at the nip therebetween. In most instances, the amount of curl is slight but can interfere with further processing of the carton blanks. Many types of liquid adhesives were tried in an effort to eliminate the curl. Therefore, it is desirable to eliminate or at least to minimize the amount of curl.

In conventional apparatus for forming carton blanks, a laminate of desired materials is made and then appropriate cut lines and fold lines are formed in the laminate. Also, the individual carton blanks may be formed at the same time or formed in a separate operation.

In the U.S. Pat. No. 3,942,708 there is disclosed a process wherein individual carton blanks of a relatively rigid material are fed onto a moving continuous strip of a relatively flexible material. It is stated that an adhesive material is applied either on the continuous strip of a relatively flexible material or on the individual carton blanks. It is further stated that the individual carton blanks are formed in a separate operation. There is no illustration or explanation of any apparatus for feeding the individual punched carton blanks onto the continuous strip of a relatively flexible material. After being deposited on the continuous strip of a relatively flexible material, each individual carton blank and the continuous strip of a relatively flexible material are pressed together by suitable apparatus.

BRIEF DESCRIPTION OF THE INVENTION

This invention provides apparatus for laminating together a continuous strip of a relatively rigid material and a continuous strip of a relatively flexible, fluid impervious material so as to prevent or minimize the curling of the lamination. In some instances, the laminate includes spaced apart relatively narrow continuous strips of a relatively flexible material. Also, the invention provides for the formation of the cut and fold lines in the continuous strip of a relatively rigid material prior to the lamination thereof to the continuous strip of a relatively flexible, fluid impervious material.

In one preferred embodiment of the invention, the apparatus comprises conventional laminating rolls each having a diameter between about 8 and 12 inches and preferably about 10 inches and comprising a first roll mounted at a fixed location for rotational movement and a second rotatable roll mounted adjacent to the first roll so as to form a nip therebetween and for movement toward or away from the first roll and urged by gravity or mechanical means toward the first roll. Drive means are provided for rotating at least one or both of the first and second rolls. At least a first guide apparatus is located to guide a continuous strip of a relatively rigid material into the nip. At least a second guide apparatus is located to guide a continuous strip of a relatively flexible material, preferably a fluid impervious material, into the nip so that the continuous strip of a relatively rigid material and the continuous strip of a relatively flexible, fluid impervious material have facing surfaces. While the guide apparatus is illustrated as rolls, it is understood that it can be of other configurations. An adhesive coating comprising a liquid adhesive, that is tacky at temperatures between about 60° F. and 110° F., is applied to at least portions of at least one of the facing surfaces. The portions of the adhesive coating are located so that a plurality of spaced apart strips of the relatively rigid material and the relatively flexible fluid impervious material are not secured together. Preferably, the portions of the adhesive coating are on the facing surface of the continuous strip of a relatively flexible fluid impervious material. The at least a first guide apparatus and the at least a second guide apparatus are located so that the continuous strip of a relatively rigid material and the continuous strip of a relatively flexible material enter the nip only from one side of a plane tangent to the first roll and the second roll at the nip to secure at least portions of the continuous strips together. The first and second guide apparatus are located so that the continuous strip of a relatively rigid material contacts the first roll before the continuous strip of a relatively flexible fluid impervious material contacts the continuous strip of a relatively rigid material. Alternatively, the first and second guide apparatus may be located so that the continuous strip of a relatively rigid material contacts the second roll before the continuous strip of a relatively flexible fluid impervious material contacts the continuous strip of a relatively rigid material.

Preferably, the second guide apparatus is located so that the portion of the continuous strip of a relatively flexible fluid impervious material contacts the portion of the continuous strip of a relatively rigid material at a location spaced about one inch from the nip between the laminating rolls.

In another preferred embodiment of the invention, rotary cutting and creasing rolls are located before the first and second rolls for forming cut lines and fold lines in the continuous strip of a relatively rigid material. Some cut lines, preferably at least one cut line, necessary for the formation of individual carton blanks are not made in the continuous strip of a relatively rigid material to retain the continuity of the continuous strip of a relatively rigid material after it leaves the cutting and creasing apparatus so that the continuous strip of a relatively rigid material having the some cut lines formed therein may be pulled through the laminating rolls. If the continuous strips have a sufficient extent in a cross-machine direction so that two carton blanks are formed at the same time, the continuous strip of a relatively rigid material is preferably appropriately cut by the rotary cutting and creasing rolls and the laminated materials are passed between a first pair of cutting rolls which cut the continuous strip of a relatively flexible fluid impervious material located between the individual carton blanks to be formed. The laminated materials then pass through a second pair of cutting rolls where the cut lines not previously made are made to form a plurality of at least two individual carton blanks which are then deposited on a first moving conveyor and further processed as described below.

In another embodiment of the invention, at least a third guide apparatus is provided to guide a plurality of spaced apart, relatively narrow continuous strips of a relatively flexible material into the nip. The third guide apparatus is located so that the plurality of spaced apart, relatively narrow continuous strips of a flexible material are located between the continuous strip of a relatively rigid material and the continuous strip of a relatively flexible material. At least other portions of an adhesive coating are located to secure the plurality of spaced apart, relatively narrow continuous strips of a relatively flexible material to portions of the continuous strip of a relatively flexible, fluid impervious material but not to the continuous strip of a relatively rigid material. In preferred embodiments of the invention, the continuous strip of a relatively rigid material comprises a composite material, as described below, each of the plurality of spaced apart, relatively narrow continuous strips of a relatively flexible material comprises paper, such as clay coated recycled Kraft paper, and the continuous strip of a relatively flexible, fluid impervious material comprises a plastic film, such as polypropylene.

If the continuous strips of the relatively rigid material and of the relatively flexible fluid impervious material are sufficiently wide to form two carton blanks, the plurality of continuous strips of a relatively flexible material are three in number with the center strip being twice as wide as the end strips. In this embodiment, the rotary cutting and creasing rolls and the first and second pair of cutting rolls function as described above. In addition to cutting the continuous strip of a relatively flexible fluid impervious material, the first pair of cutting rolls also cuts the center continuous strip of the relatively narrow continuous strips of a relatively flexible material.

Collecting apparatus is provided to form the individual carton blanks into one or more vertical stacks. The individual carton blanks are placed on the one vertical or more stacks so that the relatively flexible, fluid impervious material faces upwardly. Other types of collecting apparatus may be used such as that described below.

In some instances, depending on the thickness and quality of the continuous strip of a relatively rigid material, the cutting and creasing rolls do not remove the scrap material. In those instances, rolls located after the laminating apparatus remove the scrap material.

When two carton blanks are being formed at the same time from the laminated materials, it is necessary to remove the scrap material located between the two carton blanks. This scrap material results from the formation of the necessary middle cut lines for the individual carton blanks. Scrap removing apparatus is provided for removing the scrap material and, in a preferred embodiment of the invention, comprises a first moving conveyor having one end portion located adjacent to the second pair of cutting rolls and having a reach for receiving in succession a plurality of the at least two individual carton blanks leaving the second pair of cutting rolls. The first moving conveyor moves at a velocity so that the plurality of at least two individual carton blanks are in a spaced apart relationship on a reach thereof which reach lies generally in a horizontal plane. A second moving conveyor has one end portion located adjacent to the other end portion of the first moving conveyor and has a reach for receiving one of the at least two individual carton blanks. The second moving conveyor moves at a velocity substantially equal to the velocity of the first moving conveyor and the reach of the second moving conveyor lies in a plane inclined upwardly from the horizontal plane. A third moving conveyor has one end portion located adjacent to the other end portion of the first moving conveyor and has a reach for receiving the other of the at least two individual carton blanks. The third moving conveyor moves at a velocity substantially equal to the velocity of the first moving conveyor and the reach of the third moving conveyor lies in a plane inclined downwardly from the horizontal plane. The scrap material is completely cut from one of the at least two individual carton blanks and removably secured to the other of the at least two individual carton blanks. Therefore, the scrap materials move downwardly with the other of the at least two individual carton blanks. Portions of the scrap materials project outwardly from one edge of the other of the at least two individual carton blanks. Force applying apparatus is provided for applying sufficient force to the portion of the scrap materials projecting outwardly from the other of the at least two individual carton blanks to remove the scrap materials from the other of the at least two individual carton blanks.

In a preferred embodiment of the invention, the force applying apparatus comprises a fourth moving conveyor having a reach having at least a portion thereof located adjacent to at least a portion of the reach of the third moving conveyor with the at least a portion of the reach of the fourth moving conveyor moving in the same plane as the adjacent portion of the third moving conveyor. A fifth moving conveyor has a reach having a portion facing the at least a portion of the reach of the fourth moving conveyor and in contact therewith. The portions of the scrap materials projecting outwardly from the other of the at least two individual carton blanks are guided into contact with the contacting portions of the fourth and fifth moving conveyors. The contacting portions of the reaches of the fourth and fifth moving conveyors move between rollers so that the fourth and fifth moving conveyors move in a plane inclined downwardly from the plane of the reach of the third moving conveyor to remove the portions of scrap materials and to convey the removed portions of scrap materials to a scrap disposal location.

The invention also provides a method for forming individual carton blanks from at least a continuous strip of a relatively rigid material and at least a continuous strip of a relatively flexible fluid impervious material wherein the method comprises, moving the continuous strip of a relatively rigid material through a rotary cutting and creasing apparatus to form cut lines and fold lines therein but omitting at least one cut line to retain the continuity of the at least a continuous strip of relatively rigid material so that an applied force, an described below, continues to move the at least a continuous strip of a relatively rigid material in the desired direction; applying a force to move the at least a continuous strip of a relatively flexible fluid impervious material into a superposed relationship with the cut and creased at least a continuous strip of a relatively rigid material so as to have facing surfaces; applying a coating of an adhesive material to at least portions of the facing surfaces; providing at least two laminating rolls having a nip formed between them; rotating the at least two laminating rolls to apply the force on the cut and creased at least a continuous strip of a relatively rigid material and the at least a continuous strip of a relatively flexible fluid impervious material to pull the continuous strips between the at least two laminating rolls to secure at least portions of the continuous strips together to form a laminated product; cutting the laminated product into individual carton blanks; and collecting the individual carton blanks. In some instances, the at least a continuous strip of a relatively rigid material has a linear extent in a cross machine direction so that the rotary cutting and creasing apparatus forms cut lines and fold lines for at least two individual carton blanks having a centerline therebetween and wherein the at least a continuous strip of a relatively flexible fluid impervious material has a similar linear extent in the cross machine direction, so that the method further comprises locating the cut lines so that at least one portion of scrap material is located between the at least two individual carton blanks; forming the cut lines so that at least a portion of the at least one portion of scrap material is removably secured to only one of the at least two individual carton blanks; locating the at least a continuous strip of a relatively flexible fluid impervious material so that a portion of the at least a continuous strip of a relatively flexible fluid impervious material overlies the centerline; cutting the portion of the at least a continuous strip of a relatively flexible fluid impervious material prior to cutting the laminated product into individual carton blanks; and removing the at least one portion of scrap material from the only one of the at least two individual carton blanks by separating the at least two individual cartons so that a portion of the at least one portion of scrap material projects outwardly from an edge of one of the at least two individual carton blanks; moving the portion of the at least one portion of scrap material into force applying apparatus so as to remove the at least one portion of scrap material from the one of the at least two individual cartons; and conveying the removed at least one portion of scrap material to a scrap disposal apparatus.

BRIEF DESCRIPTION OF THE DRAWINGS

Illustrative preferred embodiments of the invention are illustrated in the drawing in which:

FIG. 7 is a schematic side elevational view of another embodiment of apparatus of this invention;

FIG. 8 is a bottom plan view of a continuous strip of a relatively rigid material after passing through the rotary cutting and creasing apparatus of FIG. 7;

FIG. 9 is an enlarged portion of FIG. 8;

FIG. 9A is an enlarged portion of FIG. 9;

FIG. 10 is an enlarged portion of FIG. 7 with parts removed;

FIG. 11 is a top plan view of FIG. 10;

In FIG. 1, there is illustrated apparatus 2 for making individual carton blanks 4. A continuous strip of a relatively rigid material 6 from a roll of such material (not shown) is moved around guide roll 8 into the nip between cutting and creasing rolls 10 and 12 which are rotated in the direction of the arrows by conventional means (not shown). The relatively rigid material comprises a conventional paperboard or a composite material such as that described in U.S. Pat. No. 4,254,173 dated Mar. 31, 1981 and issued to Peer, Jr. or other materials having similar characteristics. The cutting and creasing rolls 10 and 12 make the cut lines 14 and fold lines 16 in the continuous strip of a relatively rigid material 6. The cut lines 18, illustrated in FIG. 3 as phantom lines, between the glue tab 20 of one carton blank and the side panel 22 of the preceding carton blank are not made at this time so that the cut and creased continuous strip of a relatively rigid material 6a can be pulled through the laminating operations as described below. Scrap material 24 is deposited from the cutting and creasing roll 10 into a hopper 26.

Figure 1:
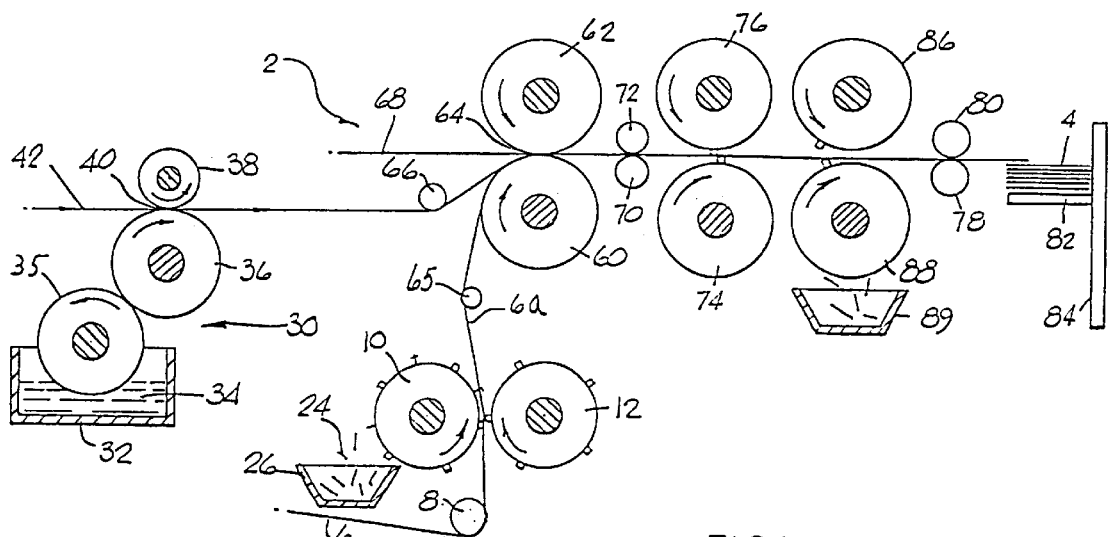
FIG. 1 is a schematic illustration of one embodiment of the invention.

Coating apparatus 30 is mounted at a fixed location. The coating apparatus 30 has a tank 32 for holding a supply of adhesive coating material 34. A rotatable transfer roll 35 is mounted so as to move into contact with the supply of the adhesive coating material 34. A driven gravure roll 36 is mounted so that raised portions thereof (not shown) will contact the transfer roll 35 to have adhesive coating material 34 transferred to the raised portion of the gravure roll 36. The adhesive coating material preferably comprises a liquid adhesive that is tacky at temperatures between about 60° F. and 110° F. As the temperature nears 110° F., the liquid adhesive becomes less effective. The liquid adhesive may be chosen from any of the variety of such liquid adhesives currently on the market. The gravure roll 36 is driven by conventional means (not shown). An idler roll 38 is mounted to form a nip between it and the gravure roll 36 and to apply pressure on the gravure roll 36. A continuous strip of a relatively flexible, fluid impervious material 42 is pulled from a roll of such material (not shown) and passes through the nip 40 and has the adhesive coating material on the gravure roll 36 deposited thereon. The continuous sheet of a relatively flexible, fluid impervious material 42 may comprise a plastic material such as polypropylene, a paper material coated with a plastic material, such as polyethylene, or other materials having similar characteristics. The pattern of the adhesive coating material may be varied. In this instance, the pattern of the raised portions of the gravure roll 36 comprises two spaced apart circumferentially extending raised portions to produce the laminated product illustrated in FIG. 6. This product comprises the relatively flexible, fluid impervious material 42 secured to the relatively rigid material 6 by two spaced apart strips 44 of adhesive so that no adhesive is at the end portions 46 and 48 and the central portion 50. The central portion 50 is twice as wide as the end portions 46 and 48 so that the product illustrated in FIG. 6 may be severed to provide two individual carton blanks 4.

Figure 3:
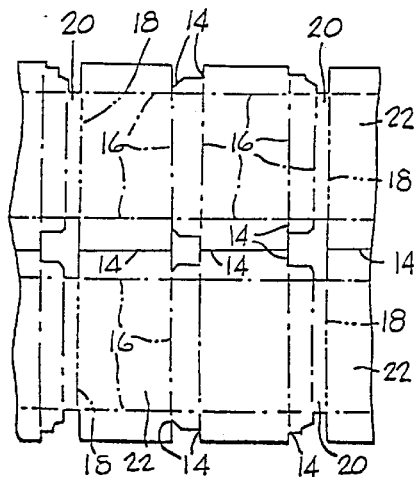
FIG. 3 is a bottom plan view of a continuous strip of a relatively rigid material having cut and fold lines prior to lamination.

It is understood that the continuous strip of a relatively rigid material 6 of FIG. 3 can be of differing shapes and have differing cut and fold line arrangements. Also, other conventional methods and materials can be used to secure together the continuous strip of a relatively rigid material and the continuous strip of a relatively flexible material.

A conventional laminating apparatus is illustrated in FIG. 1 and comprises a first roll 60 and a second roll 62 mounted to form a nip 64. Each of the rolls 60 and 62 preferably has a diameter of about ten (10) inches. Either one or both of the first and second rolls 60 and 62 may be driven by conventional means (not shown) and either one or both may be provided with a flexible surface (not shown). The first and second rolls 60 and 62 function to provide the primary force to pull the continuous strip of a relatively rigid material 6a through the cutting and creasing rolls 10 and 12 and the continuous strip of a relatively flexible fluid impervious material 42 through the gravure roll 36 and idler roll 38 and through the laminating rolls 60 and 62 to form the laminate. While the rotating cutting and creasing rolls 10 and 12 exert some pulling force on the continuous strip 6 of a relatively rigid material and the rotating gravure roll 36 and idler roll 38 exert some pulling force on the continuous strip 42 of a relatively flexible fluid impervious material, the primary pulling force exerted on the continuous strips 6 or 6a and 42 is by the first and second laminating rolls 60 and 62. The laminating rolls 60 and 62 are rotated so that the continuous strip 6a and the continuous strip 42 move through the nip 64 at a velocity between about 700 to 1000 feet per minute. Guide apparatus 65 is located so that the cut and creased continuous strip of a relatively rigid material 6a moves into contact with the first roll 60. Guide apparatus 66 is located to guide the continuous strip of a relatively flexible, fluid impervious material 42 so that the facing surfaces of the cut and creased continuous strip of a relatively rigid material 6a and the continuous strip of a relatively flexible, fluid impervious material 42 move into a contacting relationship. As illustrated in FIG. 1, the invention provides that the cut and creased continuous strip 6a of a relatively rigid material contacts the first roll 60 and then the continuous strip 42 of a relatively flexible fluid impervious material contacts the cut and creased continuous strip 6a of a relatively rigid material. The relationship insures that the continuous strip 6 of a relatively rigid material and the continuous strip 42 of a relatively flexible fluid impervious material enter the nip 64 only from one side of a plane tangent to the laminating first and second rolls 60 and 62 at the nip 64. Preferably, the continuous strip 42 of a relatively flexible fluid impervious material contacts the portion of the continuous strip 6 of a relatively rigid material on one of the rolls 60 and 62 at a location spaced about one inch from the nip 64 when the first and second rolls 60 and 62 each have a diameter of about ten inches.

It is understood that the adhesive coating material may be applied to the continuous strip of a relatively rigid material. In such an embodiment, the apparatus is arranged so that the continuous strip of a relatively rigid material contacts the surface of the first or second roll and then the continuous strip of a relatively flexible, fluid impervious material is superposed over the continuous strip of a relatively rigid material. Also, the continuous strip of a relatively rigid material and the continuous strip of a relatively flexible material enter the nip only from one side of a plane tangent to the first and second rolls at the nip.

It is understood that the cut and fold lines can be formed after the lamination has been made in a conventional manner as long as the continuous strip of a relatively rigid material and the continuous strip of a relatively flexible material enter the nip as described above to eliminate the curling problem.

The laminated product then moves between cutting rolls 70 and 72 which cuts the continuous strip of a relatively flexible, fluid impervious material in the machine direction at the central portion 50 to form two laminated products which then pass between cutting rolls 74 and 76 which make the cut lines 18 between the glue tab 20 of one carton blank and the side panel 22 of the preceding carton blank. After being cut, the carton blanks 4 are fed by feed rolls 78 and 80 into stacking apparatus which is schematically illustrated as a vertically moveable platform 82 which is mounted for movement over support means 84. The laminated product is moved through the cutting rolls 70, 72, 74 and 76 to the feed rolls 78 and 80 in a conventional manner. The upper surface of the carton blanks 4 stacked on the platform 82 comprises the relatively flexible, fluid impervious material 42. There can be more than one stacking apparatus.

In some instances, depending on the thickness and quality of the continuous strip of a relatively rigid material 6, the cutting and creasing rolls 10 and 12 do not remove the cut scrap material 24. In those instances, rolls 86 and 88 remove the cut scrap material 24 and deposit it into a hopper 89.

Figure 2:
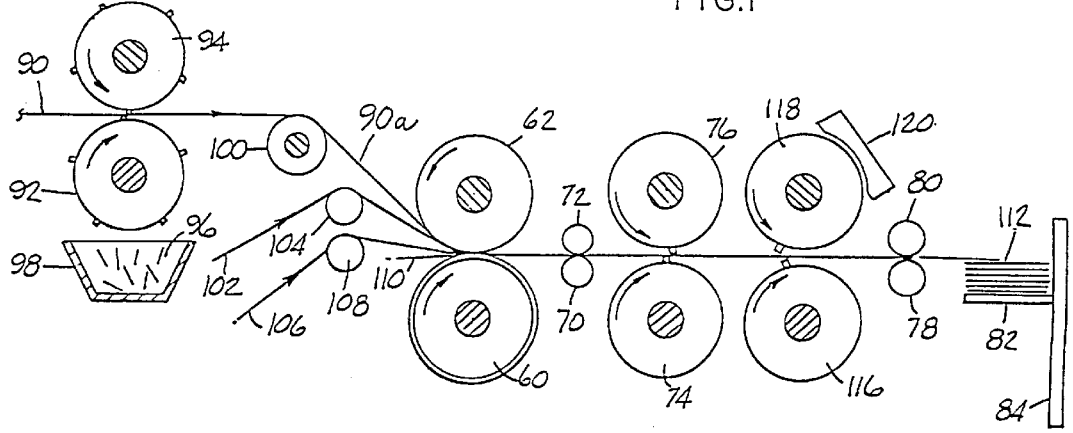
FIG. 2 is a schematic illustration of another embodiment of the invention.

Another preferred embodiment of the invention is illustrated in FIG. 2 wherein a continuous strip of a relatively rigid material 90 moves into the nip between cutting and creasing rolls 92 and 94 which are rotated in the direction of the arrows by conventional means (not shown) to form the product described above and illustrated in FIG. 3. Scrap material 96 is deposited from the cutting and creasing roll 92 into the hopper 98. The continuous strip of a relatively rigid material 90 is similar to the continuous strip of a relatively rigid material 6. It is understood that carton blanks differing from the carton blanks of FIG. 3 may be made by changing the configuration of the cutting and creasing means on the cutting and creasing rolls 10, 12, 92 and 94.

The portions of the laminating, cutting and stacking apparatus of FIG. 2 corresponding to similar portions of the laminating, cutting and stacking apparatus of FIG. 1 have been given the same reference numerals. After passing through the cutting and creasing rolls 92 and 94, the continuous strip of a relatively rigid material 90 moves over guide apparatus 100 into contact with the second roll 62. A plurality of spaced apart, relatively narrow continuous strips of a relatively flexible material 102 are pulled from rolls of such material (not shown) and move over guide apparatus 104 so that facing surfaces of the continuous strip of a relatively rigid material 90 and the plurality of spaced apart, relatively narrow continuous strips of a relatively flexible material 102 move into a contacting relationship. A continuous strip of a relatively flexible, fluid impervious material 106, which has been provided with an adhesive coating by coating apparatus (not shown), similar to coating apparatus 30 but having a different pattern, moves over apparatus 108 so that a facing surface thereof moves into contacting relationship with the facing surfaces of the plurality of spaced apart, relatively narrow continuous strips of a relatively flexible material 104 and the portions of the facing surface of the continuous strip of the relatively rigid material 90 not in contact with the facing surfaces of the plurality of spaced apart, relatively narrow continuous strips of the relatively flexible material 104 to form a laminate described more fully below. The apparatus 100, 104 and 108 are located so that the continuous strip of a relatively rigid material 90, the plurality of spaced apart, relatively narrow continuous strips of a relatively flexible material 102 and the continuous strip of a relatively flexible, fluid impervious material 106 enter the nip 64 only from one side of a plane 110 tangent to the first and second rolls 60 and 62 at the nip 64. As illustrated in FIG. 2, the invention provides that the cut and creased continuous strip 90a of a relatively rigid material contacts the second roll 62 and then the plurality of continuous strips 102 of a relatively flexible material contacts the cut and creased continuous strip 90*a* and then the continuous strip 106 of a relatively flexible material contacts the plurality of continuous strips 102 and the cut and creased continuous strip 90*a*. As described above, the continuous strip 106 of a relatively flexible fluid impervious material contacts the continuous strip 90*a* of a relatively rigid material and the continuous strips 104 of a relatively flexible material at a location spaced about one inch before the nip 64. It is noted that in all instances, the guiding surfaces of the guide apparatus 65 and 66 of FIG. 1 and the guide apparatus 100, 104 and 108 of FIG. 2 are all located spaced from one side of the plane 68 in FIG. 1 and the plane 110 in FIG. 2 so that the continuous strips of material all enter the nip from one side of the plane tangent to the laminating rolls at the nip while in contacting relationship as described above. The laminated product, illustrated in FIG. 5, then passes through the cutting rolls 70 and 72 to cut the strip of a relatively flexible, fluid impervious material 106 and the continuous strip of a relative flexible material 126 secured thereto to form two laminated products which then pass between the cutting rolls 74 and 76 which cut the cut lines 18 between the glue tab 20 of one carton blank and the side panel 22 of the preceding carton blank. After being cut, the carton blanks 112 are fed into conventional inverting apparatus (not shown) which inverts the carton blanks 112 so that the upper surfaces of the carton blanks 112 on the platform 82 comprise the relatively flexible, fluid impervious material 106.

As described above, in some instances, depending on the thickness and quality of the continuous strip of a relatively rigid material 90, the cutting and creasing rolls 92 and 94 do not remove the cut scrap material 96. In those instances, rolls 116 and 118 remove the cut scrap material 96 and a vacuum manifold 120 removes the cut scrap material 96 from the roll 118.

Figure 4:
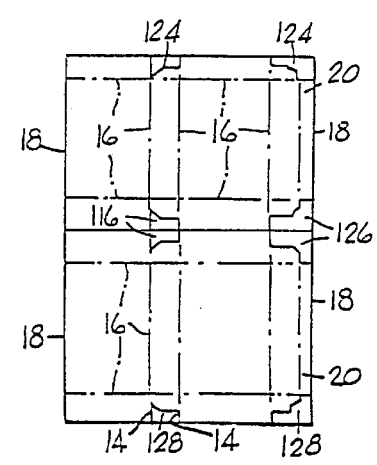
FIG. 4 is a bottom plan view of two individual carton blanks.
Figures 5, 6:
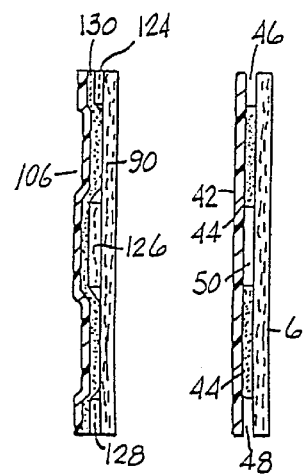
FIG. 5 is a cross-sectional view of one embodiment of a carton blank.
FIG. 6 is a cross-sectional view of another embodiment of a carton blank.

The carton blank 112 illustrated in FIGS. 4 and 5 comprises a laminate of the relatively rigid material 90, the plurality of spaced apart relative narrow strips of a relatively flexible material 124, 126 and 128, which are not secured to the relatively rigid material 90, and an adhesive coating 130 that secures the spaced apart relative narrow continuous strips of a relatively flexible material 124, 126 and 128 to portions of the relatively flexible, fluid impervious material 106 and other portions of the relatively flexible fluid impervious material 106 to portions of the relatively rigid material 90. The strip 126 is twice as wide as the strips 124 and 128 so that two carton blanks 112 can be formed. The continuous strips 124, 126 and 128 may be formed from a Kraft paper or other materials having similar characteristics.

In FIG. 7, another embodiment of apparatus 202 for carrying out the inventive concepts of this application is schematically illustrated. The apparatus 202 comprises a roll 204 of a relatively rigid material mounted so that a continuous strip 206 may be pulled therefrom. The continuous strip 206 is pulled through straightening apparatus 208 by pull rolls 210. The continuous strip 206 of the relatively rigid material then moves through the rotating cutting and creasing apparatus 212 wherein cut lines 14 and fold lines 16, similar to FIG. 3, are formed therein. As described above, although the rotating cutting and creasing apparatus apply some pulling force, the primary pulling force moving the continuous strip of a relatively rigid material through the cutting and creasing apparatus 212 is the pulling force of the laminating rolls described below. The cut line 18, illustrated as a phantom line in FIG. 3, is not illustrated in FIGS. 8 and 9 since, as described above, it is not made at this time. As illustrated in FIG. 9, the cut lines 14 leave a first portion 214 of scrap material and a second portion 216 of scrap material. Also, as illustrated in FIGS. 8 and 9, the cut lines 14 leave scrap edge portions 218 and 220. As illustrated in FIGS. 8 and 9, two carton blanks 4*a* and 4*b* are being formed and the continuous strip 6 has opposite edge portions 222 and 224. The cut lines 14 adjacent to the edge portions 222 and 224 have small notch portions (not shown) removably retaining the edge portions 218 and 220 to the carton blanks 4*a* and 4*b*. If the cut lines 18 were made in the continuous strip 206 of a relatively rigid material, the notch portions would not have sufficient strength to retain the continuity of the continuous strip 206 of a relatively rigid material so that it can be pulled through the laminating rolls as described below. The cut lines 14 between the scrap portions 214 and 216 and the carton blanks 4*b* have small notch portions 226, FIG. 9*a*, removably retaining the scrap portions 214 and 216 to the carton blanks 4*b* so that the scrap portions 214 and 216 may be removed from the carton blanks 4*b* as described below.

Three rolls 230, 232, 234 of a relatively flexible material, such as the Kraft paper described above, are mounted so that relatively narrow continuous strips 236, 238 and 240 may be pulled therefrom in response to the pulling force of the laminating rolls, as described below. The three rolls 230, 232 and 234 are mounted in a conventional apparatus having braking means and straightening means associated therewith. The continuous strips 236, 238 and 240 are guided into a superposed relationship with the carton blanks 4*a* and 4*b* by the guide rolls 242.

The continuous strip 206 of a relatively rigid material and the continuous strips of a relatively narrow flexible material 236, 238 and 240 are pulled through a hot melt adhesive applying apparatus 244 by the laminating rolls (described below) wherein portions of the continuous strip 206 of a relatively rigid material and the continuous strips 236, 238 an 240 of a relatively narrow flexible material are coated with a hot melt adhesive that is tacky at temperatures of between about 300° F. and 400° F. If the carton blanks being produced do not require the continuous strips 236, 238 and 240, then only the continuous strip 206 of a relatively rigid material passes through the hot melt adhesive applying apparatus 244.

A roll 250 of a relatively flexible fluid impervious material, as described above, is mounted so that a continuous strip 252 may be pulled therefrom in response to the pulling force exerted thereon by the laminating rolls, as described below. The mounting apparatus for the roll 250 is similar to the mounting apparatus for the rolls 230, 232 and 234.

The continuous strip 252 of a relatively flexible material and the adhesive coated continuous strip 206 of a relatively rigid material are pulled through the laminating rolls 256 and 258, which rolls are similar to the rolls 60 and 62. The laminating rolls 256 and 258 function similarly to the laminating rolls 60 and 62 in that they provide the primary pulling force to move the continuous strip 206 of the relatively rigid material from the pull rolls 210 through the cutting and creasing rolls 212 and the hot melt adhesive applying apparatus 244; the continuous strips 236, 238 and 240 of a relatively flexible material from the rolls 230, 232, and 234 and the continuous strip 252 of a relatively flexible fluid impervious material from the roll 250 and then through the laminating rolls 256 and 258 to form the laminated product. As described above, the laminating rolls 256 and 258 are rotated at a velocity sufficient to move the continuous strip 252 of a relatively flexible fluid impervious material and the continuous strip 206 of a relatively rigid material at a velocity between about 700 to 1000 feet per minute. Since the distance between the hot melt adhesive applying apparatus 244 and the laminating rolls 256 and 258 is relatively small, the hot melt adhesive substantially retains its temperature. If the continuous strips 236, 238 and 240 have been superposed on the continuous strip 206, they also move between the laminating rolls 256 and 258. If has been found that when a hot melt adhesive is applied, the curling problem does not exist. If the curling problem does arise, the continuous strips 206, 236, 238, 240 and 252 are fed to the nip between the laminating rolls 256 and 258 as described above. The laminating rolls 256 and 258 function to secure together the adhesive coated portions of the continuous strips 206 and, when used, the continuous strips 236, 238 and 240 to portions of the continuous strip 252. Carton blanks 4a and 4b formed without the continuous strips 236, 238 and 240 are illustrated in FIG. 6 and carton blanks 4a and 4b formed with the continuous strips 236, and 238 and 240 are illustrated in FIG. 5.

The laminated product leaving the laminating rolls 256 and 258 is pulled between cutting apparatus 260 which cuts the portion of the continuous strip 252 or the portions of the continuous strips 252 and 238 superposed over the centerline 262 but does not cut the scrap portions 214 and 216.

The laminated product then passes through cutting apparatus 264 which makes the cut lines 18 to divide the laminated product into carton blanks 4a and 4b. The cutting apparatus 264 and conventional nip rolls associated therewith provides the force to move the laminated product through the cutting apparatus 260 and 264 and the carton blanks 4a and 4b onto a first moving conveyor 270.

The first moving conveyor 270 has a reach 272 and a reach 274 which are located to have portions thereof in contact with the carton blanks 4a and 4b as illustrated in FIG. 10. The first moving conveyor 270 moves at a velocity greater than the velocity at which the carton blank 4a and 4b are discharged from the cutting apparatus 264 so that the carton blanks 4a and 4b are in a spaced apart relationship on the first moving conveyor 270 as illustrated in FIG. 11 wherein the reach 272 has been removed. The cut lines and fold lines are not illustrated in the carton blanks of FIGS. 11–14. The first moving conveyor 270 lies generally in a horizontal plane and has conventional apparatus 276 for providing its movement. Scrap removing apparatus (not shown) is located in the cutting apparatus 264 to remove the scrap edge portions 218 and 220.

A second moving conveyor 280 has a reach 282 and a reach 284 which are located to have portions thereof in contact with the carton blanks 4a. The second moving conveyor 280 moves at substantially the same velocity as the first moving conveyor 270. The second moving conveyor 280 lies in a plane inclined upwardly from the first moving conveyor 270 so that when a carton blank 4a moves from the first moving conveyor 270 to the second moving conveyor 280, the carton blank 4a moves from a location adjacent to the carton blank 4b. The second endless moving conveyor 280 has conventional apparatus 286 and 288 for providing its movement.

A third moving conveyor 290 has a reach 292 and a reach 294 which are located to have portions thereof in contact with the carton blanks 4b. The third endless moving conveyor moves at a velocity substantially the same as the velocity of the first 270 and second 280 endless moving conveyors. The third moving conveyor 290 lies in a plane inclined downwardly from the first endless moving conveyor 270 so that when the carton blank 4b moves from the first moving conveyor 270 to the third moving conveyor 290, the carton blank 4b moves from a location adjacent to the carton blank 4a. The third moving conveyor 290 has conventional apparatus 296 and 298 for providing its movement.

Figure 12:
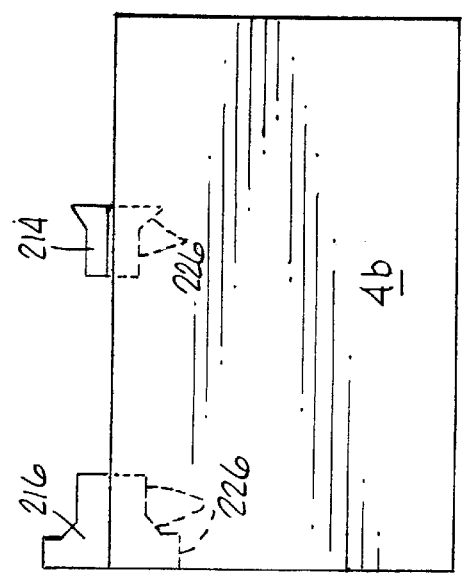
FIG. 12 is a top plan view of a carton blank prior to the removal of the scrap materials.
Figure 13:
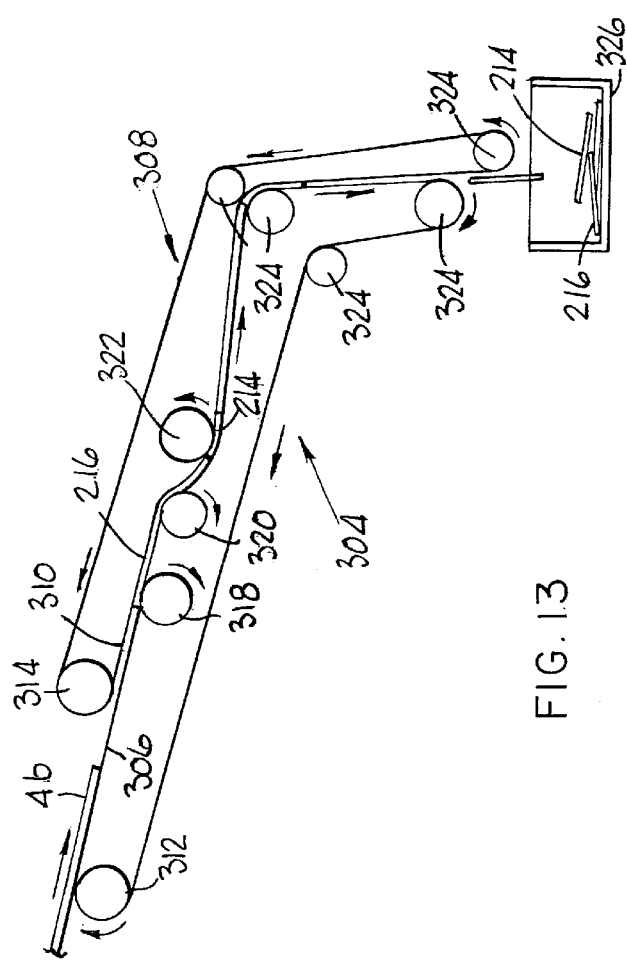
FIG. 13 is a schematic side elevational view of a scrap removing apparatus.
Figure 14:
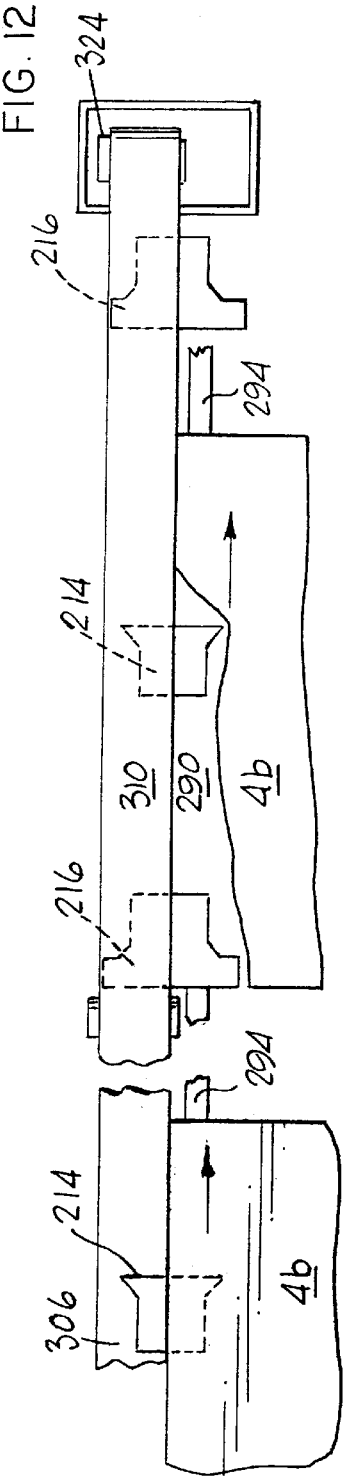
FIG. 14 is a schematic top plan view illustrating the removal of the scrap materials.

Scrap removal apparatus 302, FIG. 11, is illustrated generally in FIGS. 7 and 11 and more specifically in FIGS. 12–14. In FIG. 12, there is illustrated the carton blank 4b as it moves onto the third moving conveyor 290. As the carton blanks 4a and 4b are separated by the second 280 and third 290 moving conveyors, the scrap portions 214 and 216 move with the blank 4b because of the notch portions 226.

The scrap removal apparatus 302 is illustrated in FIGS. 13 and 14 and includes a fourth moving conveyor 304 having a reach 306 and a fifth moving conveyor 308 having a reach 310 which reaches are located so that portions thereof contact and remove the scrap portions 214 and 216 as described below. Portions of the fourth 304 and fifth 308 moving conveyors are guided for movement over rolls 312, 314, 318, 320, 322 and 324. The reaches 306 and 310 between the rolls 312 and 320 move in the same planes as the reaches 292 and 294 of the third moving conveyor 290. As illustrated in FIG. 14, the portions of the scrap portions 214 and 216 projecting outwardly from the carton blanks 4b are located above the reach 306 and then move between the reaches 306 and 310 and are held securely therebetween. As the reaches 306 and 310 move between the rolls 320 and 322, the reaches 306 and 310 are moved downwardly to separate the scrap portions 214 and 216 from the carton blanks 4b. The fourth 304 and fifth 308 moving conveyors carrying the removed scrap portions 214 and 216 move around the remaining rolls 324 located so that the removed scrap portions 214 and 216 are deposited in scrap removal apparatus 326.

The carton blanks 4a move from the second moving conveyor 280 onto a collection conveyor 328, FIG. 10, and the carton blanks 4b move from the third moving conveyor 290 onto a collection conveyor 330.

While illustrative and presently preferred embodiments of the invention have been described in detail herein, it is to be understood that the inventive concept may be otherwise variously embodied and employed and that the appended claims are intended to be construed to include such variations except insofar as limited by the prior art.

What is claimed:

1. Apparatus for forming a laminate of materials for use in forming a plurality of individual carton blanks to substantially eliminate any curl in each of the individual carton blanks comprising:

a first laminating roll mounted at a fixed location for rotational movement;

a second laminating roll mounted adjacent to said first laminating roll so as to form a nip therebetween and also mounted for rotational movement;

drive apparatus for rotating at least one of said first and second laminating rolls so as to rotate both of said first and second laminating rolls;

a plurality of spaced apart guides for guiding a plurality of continuous strips of material each of said plurality of spaced apart guides having a guiding surface for guiding at least one of said plurality of continuous strips of material so that adjacent continuous strips of material have facing surfaces;

apparatus for applying an adhesive coating material on at least portions of one of said facing surfaces wherein said adhesive coating material is tacky at temperatures between about 60° F. and 110° F.;

at least one of said continuous strips of material comprising a relatively rigid material;

at least another of said continuous strips of material comprising a relatively flexible, fluid impervious material;

all of said plurality of guiding surfaces being at locations spaced from one side of a plane tangent to said first and second laminating rolls at said nip so that all of said continuous strips of material enter said nip only from said one side of said plane tangent to said first and second laminating rolls at said nip to secure said continuous strips of material together;

cutting and creasing apparatus for forming cut and fold lines in said continuous sheet of a relatively rigid material and for cutting said laminated continuous strips into a plurality of individual carton blanks; and stacking apparatus for superposing and stacking each of said plurality of individual carton blanks wherein each of said plurality of individual carton blanks has substantially no curl.

2. Apparatus as in claim 1 and further comprising:

at least additional ones of said continuous strips of material comprising a plurality of spaced apart continuous strips of a relatively flexible material located between said continuous strip of a relatively rigid material and said continuous strip of a relatively flexible, fluid impervious material to secure portions of said continuous strip of a relatively rigid material, said plurality of spaced apart continuous strips of a relatively flexible material and portions of said continuous strip of a relatively flexible, fluid impervious material together.

3. Apparatus as in claim 2 wherein said cutting and greasing apparatus comprises:

rotary cutting and creasing apparatus for forming substantially all of the cut lines and fold lines for a carton blank in said continuous strip of a relatively rigid material and located before said first and second laminating rolls; and said cutting and creasing apparatus comprises only cutting apparatus for cutting said laminated continuous strips into individual carton blanks.

4. Apparatus as in claim 2 wherein:

all of said plurality of guides being located so that said continuous strip of a relatively rigid material contacts one of said first and second laminating rolls, then at least portions of said at least additional ones of said continuous strips of a relatively flexible material move into contact with at least portions of said continuous strip of a relatively rigid material and then at least portions of said continuous strip of a relatively flexible, fluid impervious material move into contact with at least portions of said additional ones of said continuous strips of a relatively flexible material and at least portions of said continuous strip of a relatively rigid material prior to entering said nip.

5. Apparatus as in claim 3 wherein:

said rotary cutting and creasing apparatus cutting all but one of the cut lines necessary to form said at least a continuous strip of a relatively rigid material into individual carton blanks.

6. Apparatus as in claim 1 wherein said cutting and creasing apparatus comprises:

rotary cutting and creasing apparatus for forming substantially all of the cut lines and fold lines for a carton blank in said continuous strip of a relatively rigid material and located before said first and second laminating rolls; and said cutting and creasing apparatus comprises only cutting apparatus for cutting said laminated continuous strips into individual carton blanks.

7. Apparatus as in claim 1 wherein:

all of said plurality of guides being located so that said continuous strip of a relatively rigid material contacts one of said first and second laminating rolls and then at least portions of said continuous strip of relatively flexible material move into contact with at least portions of said continuous strip of relatively rigid material in contact with said one of said first and second laminating rolls prior to entering said nip.

8. Apparatus as in claim 1 wherein:

said relatively rigid material comprises a paperboard; and said relatively flexible fluid impervious material comprises a plastic film.

9. Apparatus for use in forming carton blanks comprising:

rotary cutting and creasing apparatus mounted at a fixed location;

moving apparatus for moving a continuous strip of a relatively rigid material into said rotary cutting and creasing apparatus so that said rotary cutting and creasing apparatus forms substantially all of the cut lines and fold lines for a carton blank in said continuous strip of a relatively rigid material;

a first laminating roll mounted at a fixed location;

a second laminating roll mounted adjacent to said first laminating roll so as to form a nip therebetween;

drive apparatus for rotating at least one of said first and second laminating rolls so as to rotate both of said first and second laminating rolls;

at least a first guide apparatus for guiding said continuous strip of a relatively rigid material having said cut and fold lines into said nip;

at least a second guide apparatus for guiding a continuous strip of a relatively flexible, fluid impervious material into said nip so that said continuous strip of a relatively rigid material and said continuous strip of a relatively flexible, fluid impervious material have facing surfaces;

apparatus for applying an adhesive coating material on at least portions of one of said facing surfaces;

said first and second laminating rolls applying sufficient force on said continuous strips of said relatively rigid and relatively flexible materials at said nip so as to pull said continuous strip through said first and second laminating rolls and to laminate said continuous strip of said relatively rigid material and said continuous strip of a relatively flexible fluid impervious material together;

said rotary cutting and creasing apparatus being located before said first and second laminating rolls;

said substantially all of the cut and fold lines are for the carton blank but do not change the continuity of said continuous strip of a relatively rigid material so that said first and second laminating rolls continue to exert a pulling force on said continuous strip of a relatively rigid material without destroying said continuity of said continuous strip of a relatively rigid material;

apparatus for cutting additional cut lines in said laminated continuous strips of said relatively rigid material and said relatively flexible, fluid impervious material to form individual carton blanks having cut and fold lines; and collection apparatus for collecting said individual carton blanks.

10. Apparatus as in claim 9 and further comprising;

said continuous strip of a relatively rigid material having opposite side edge portions extending in the machine direction; and guide apparatus for guiding a plurality of relatively narrow continuous strips of a relatively flexible material into a spaced apart superposed relationship over said continuous strip of a relatively rigid material with one of said plurality of relatively narrow continuous strips being adjacent to one of said opposite side edge portions and a second one of said plurality of relatively narrow continuous strips being adjacent to the other of said opposite side edge portions said opposite side edge portions and a third one of said relatively narrow continuous strips overlying said centerline of said continuous strip of a relatively rigid material.

11. Apparatus for use in forming carton blanks comprising:

rotary cutting and creasing apparatus mounted at a fixed location;

moving apparatus for moving a continuous strip of a relatively rigid material into said rotary cutting and creasing apparatus so that said rotary cutting and creasing apparatus forms substantially all of the cut lines and fold lines for a carton blank in said continuous strip of a relatively rigid material;

a first laminating roll mounted at a fixed location;

a second laminating roll mounted adjacent to said first laminating roll so at to form a nip therebetween;

drive apparatus for rotating at least one of said first and second laminating rolls so as to rotate both of said first and second laminating rolls;

at least a first guide apparatus for guiding said continuous strip of a relatively rigid material having said cut and fold lines into said nip;

at least a second guide apparatus for guiding a plurality of spaced apart, relatively narrow continuous strips of a relatively flexible material into said nip to cover spaced apart portions of said continuous strip of a relatively rigid material;

at least a third guide for guiding a continuous strip of a relatively flexible, fluid impervious material into said nip so that said continuous strip of a relatively rigid material, said plurality of spaced apart, relatively narrow continuous strips of a relatively flexible material and said continuous strip of a relatively flexible material have facing surfaces;

at least portions of said facing surfaces having an adhesive coating thereon;

said first and second laminating rolls applying sufficient force on said continuous strip of said relatively rigid material, said plurality of spaced apart, relatively narrow continuous strips of a relatively flexible material and said continuous strip of a relatively flexible, fluid impervious material at said nip so as to pull said continuous strips through said first and second laminating rolls and to laminate portions of said continuous strip of said relatively rigid material to portions of said continuous strip of a relatively flexible, fluid impervious material together and at least portions of said plurality of spaced apart, relatively narrow continuous strips of a relatively flexible material to other portions of said continuous strip of a relatively flexible, fluid impervious material together;

said rotary cutting and creasing apparatus being located before said first and second laminating rolls;

said substantially all of the cut and fold lines are for the carton blank but do not change the continuity of said continuous strip of relatively rigid material so that said first and second laminating rolls continue to exert a pulling force on said continuous strip of a relatively rigid material without destroying said continuity of said continuous strip of a relatively rigid material;

cutting apparatus for cutting additional cut lines in said laminated continuous strips of said relatively rigid material, at least one of said plurality of spaced apart, relatively narrow continuous strips of a relatively flexible material and said continuous strip of a relatively flexible, fluid impervious material to form individual carton blanks; and collection apparatus for collecting said individual carton blanks.

12. Apparatus as in claim 11 and further comprising:

said continuous strip of a relatively rigid material having a linear extent in a cross-machine direction so that at least two individual carton blanks are in a side by side relationship;

said at least two individual carton blanks having a centerline therebetween;

said continuous strip of a relatively flexible, fluid impervious material having a linear extent in a cross-machine direction that corresponds to said linear extent of said at least a continuous strip of a relatively rigid material so that at least a portion of said at least a continuous strip of a relatively flexible, fluid impervious material overlies said centerline;

at least a portion of one of said plurality of spaced apart, relatively narrow continuous strips of a relatively flexible material overlying said centerline; and additional cutting apparatus located for cutting said at least a portion of said continuous strip of a relatively flexible, fluid impervious material and said one of said plurality of spaced apart, relatively narrow continuous strips of a relatively flexible material overlying said centerline.

13. Apparatus as in claim 12 said further comprising:

said at least most of the cut lines defining at least one portion of scrap material located between said at least two individual carton blanks;

at least a portion of said at least one portion of scrap material being at least removably secured to only one of said at least two individual carton blanks; and scrap removing apparatus for removing said at least one portion of scrap material.

14. Apparatus as in claim 13 wherein said scrap material removing apparatus comprises:

a first moving conveyor having one end portion located adjacent to said cutting apparatus and having a reach for receiving in succession a plurality of said at least two individual carton blanks leaving said cutting apparatus;

said first moving conveyor moving at a velocity so that said plurality of said at least two individual carton blanks are in a spaced apart relationship on said reach;

said reach lying generally in a horizontal plane;

a second moving conveyor having one end portion located adjacent to the other end portion of said first moving conveyor and having a reach for receiving one of said at least two individual carton blanks;

said second moving conveyor moving at a velocity substantially equal to the velocity of said first moving conveyor;

said reach of said second moving conveyor lying in a plane inclined upwardly from said horizontal plane;

a third moving conveyor having one end portion located adjacent to said other end portion and having a reach for receiving the other of said at least two individual carton blanks;

said other of said at least two individual carton blanks having said at least one portion of scrap material removably secured thereto;

a portion of said at least one portion of scrap material projecting outwardly from one edge of said other of said at least two individual carton blanks;

said third moving conveyor moving at a velocity substantially equal to the velocity of said first moving conveyor;

said reach of said third moving conveyor lying in a plane inclined downwardly from said horizontal plane; and force applying apparatus for applying sufficient force on said portion of said at least one portion of scrap material to remove said at least one portion of scrap material from said other of said at least two individual carton blanks.

15. Apparatus as in claim 14 wherein said force applying apparatus comprises:

a pair of spaced apart rollers mounted adjacent to at least a portion of said reach of said third moving conveyor;

a fourth moving conveyor having a reach having at least a portion thereof located adjacent to said at least a portion of said reach of said third moving conveyor;

at least a portion of said reach of said fourth moving conveyor passing between said pair of spaced apart rollers and in contact with one of said pair of spaced apart rollers;

a fifth moving conveyor having a reach facing at least a portion reach of said fourth moving conveyor;

at least a portion of said reach of said fifth moving conveyor passing between said pair of spaced apart rollers and in contact with the other of said pair of spaced apart rollers; and said pair of spaced apart rollers being located so that said portion of said at least a portion of scrap material into contact with said portions of said fourth and fifth moving conveyors moving between said pair of spaced apart rollers moves in a plane inclined downwardly from said plane of said reach of said third moving conveyor to remove said at least one portion of scrap material.

16. Apparatus as in claim 15 wherein:

said reach of said fourth moving conveyor and said reach of said fifth moving conveyor being located so that said removed portion of said at least one portion of scrap material is held therebetween and moves therewith to be discharged therefrom at an end portion thereof; and scrap removal apparatus located adjacent to said end portion to receive said discharged at least one portion of scrap material.

* * * * *